United States Patent
Li (10) Patent No.: US 9,148,286 B2
(45) Date of Patent: Sep. 29, 2015

(54) PROTECTING AGAINST COUNTERFEIT ELECTRONIC DEVICES

(75) Inventor: Hui Li, Singapore (SG)

(73) Assignee: FINISAR CORPORATION, Sunnyvale, CA (US)

( * ) Notice: Subject to any disclaimer, the term of this patent is extended or adjusted under 35 U.S.C. 154(b) by 842 days.

(21) Appl. No.: 12/251,139

(22) Filed: Oct. 14, 2008

(65) Prior Publication Data

US 2009/0100502 A1    Apr. 16, 2009

Related U.S. Application Data

(60) Provisional application No. 60/980,069, filed on Oct. 15, 2007.

(51) Int. Cl.
| | |
|---|---|
| *H04L 9/32* | (2006.01) |
| *G06F 1/26* | (2006.01) |
| *G06F 21/31* | (2013.01) |
| *H04B 10/40* | (2013.01) |

(52) U.S. Cl.
CPC .............. *H04L 9/3271* (2013.01); *G06F 1/266* (2013.01); *G06F 21/31* (2013.01); *G06F 2221/2129* (2013.01); *H04B 10/40* (2013.01)

(58) Field of Classification Search
CPC ........ H04L 9/3271; G06F 1/266; H04B 10/40
USPC ................................................. 713/169–170
See application file for complete search history.

(56) References Cited

U.S. PATENT DOCUMENTS

| | | | |
|---|---|---|---|
| 4,799,061 A * | 1/1989 | Abraham et al. ............ 340/5.26 |
| 4,896,319 A | 1/1990 | Lidinsky et al. | |
| 4,905,301 A | 2/1990 | Krolopp et al. | |
| 5,122,893 A * | 6/1992 | Tolbert ........................... 398/135 |
| 5,351,295 A | 9/1994 | Perlman et al. | |
| 5,386,468 A | 1/1995 | Akiyama et al. | |
| 5,548,106 A * | 8/1996 | Liang et al. .................... 235/454 |
| 5,909,491 A | 6/1999 | Luo | |
| 6,028,937 A * | 2/2000 | Tatebayashi et al. ......... 713/169 |
| 6,052,604 A | 4/2000 | Bishop et al. | |
| 6,058,476 A | 5/2000 | Matsuzaki | |
| 6,108,785 A * | 8/2000 | Poisner ........................... 726/20 |

(Continued)

FOREIGN PATENT DOCUMENTS

| | | |
|---|---|---|
| EP | 898397 A2 | 2/1999 |
| WO | 00/65770 | 11/2000 |

OTHER PUBLICATIONS

The Reality of Risks from Consented use of USB Devices; Marwan Al-Zarouni;. 2006; Australian Information Security Management; Conference Security Research Institute Conferences.*

(Continued)

*Primary Examiner* — James Turchen
(74) *Attorney, Agent, or Firm* — Maschoff Brennan (57) ABSTRACT

An embodiment of the invention includes a method of authenticating a second device connected to a first device. The method includes transmitting a first data string from the first device to the second device and receiving a second data string at the first device from the second device. The method also includes generating a third data string using an alteration key at the first device and comparing the third data string and either the first data string or the second data string. The method further includes authenticating the second device if the compared data strings match.

10 Claims, 4 Drawing Sheets

(56) References Cited

U.S. PATENT DOCUMENTS

| | | | |
|---|---|---|---|
| 6,128,389 A | 10/2000 | Chan et al. | |
| 6,223,042 B1 | 4/2001 | Raffel | |
| 6,240,517 B1 | 5/2001 | Nishioka | |
| 6,253,322 B1 | 6/2001 | Susaki et al. | |
| 6,362,869 B1 | 3/2002 | Silverbrook | |
| 6,370,249 B1 | 4/2002 | Van Oorschot | |
| 6,374,354 B1 | 4/2002 | Walmsley et al. | |
| 6,442,525 B1 | 8/2002 | Silverbrook et al. | |
| 6,493,825 B1 | 12/2002 | Blumenau et al. | |
| 6,760,752 B1 | 7/2004 | Liu et al. | |
| 6,906,426 B2 | 6/2005 | Sefidvash | |
| 6,912,361 B2* | 6/2005 | Aronson et al. | 398/135 |
| 6,912,663 B1* | 6/2005 | Dayan et al. | 726/16 |
| 6,938,166 B1 | 8/2005 | Sarfati et al. | |
| 7,042,406 B2 | 5/2006 | McFarland et al. | |
| 7,149,430 B2 | 12/2006 | Hosking et al. | |
| 7,151,665 B2 | 12/2006 | Ino et al. | |
| 7,197,298 B2 | 3/2007 | Azuma | |
| 7,313,697 B2 | 12/2007 | Meyer et al. | |
| 7,356,357 B2 | 4/2008 | DeCost et al. | |
| 7,371,014 B2 | 5/2008 | Willis et al. | |
| 7,450,719 B2 | 11/2008 | Lee et al. | |
| 7,552,475 B2* | 6/2009 | Piwonka et al. | 726/22 |
| 7,580,988 B2 | 8/2009 | Rudd | |
| 7,581,891 B2 | 9/2009 | Wang | |
| 7,657,740 B2 | 2/2010 | Numao et al. | |
| 7,680,413 B2 | 3/2010 | Greenspan | |
| 7,681,247 B2 | 3/2010 | Williams | |
| 7,697,691 B2 | 4/2010 | Sutton et al. | |
| 7,716,477 B2 | 5/2010 | Omori et al. | |
| 7,724,907 B2 | 5/2010 | Candelore | |
| 7,730,401 B2* | 6/2010 | Gillespie et al. | 715/702 |
| 7,734,046 B2* | 6/2010 | Urban et al. | 380/46 |
| 7,747,541 B2* | 6/2010 | Walmsley et al. | 705/67 |
| 7,784,105 B2* | 8/2010 | Chiku | 726/34 |
| 7,823,214 B2 | 10/2010 | Rubinstein et al. | |
| 7,845,016 B2* | 11/2010 | Diab et al. | 726/34 |
| 8,165,297 B2* | 4/2012 | Hoffmann | 380/256 |
| 8,332,669 B2* | 12/2012 | Darmawan et al. | 713/300 |
| 8,762,714 B2 | 6/2014 | Hsieh | |
| 8,819,423 B2 | 8/2014 | Ekkizogloy | |
| 2001/0037467 A1 | 11/2001 | O'Toole et al. | |
| 2001/0052850 A1 | 12/2001 | Zimmerman | |
| 2002/0018458 A1 | 2/2002 | Aiello et al. | |
| 2002/0136169 A1 | 9/2002 | Struhsaker et al. | |
| 2002/0137472 A1 | 9/2002 | Quinn et al. | |
| 2002/0164026 A1 | 11/2002 | Huima | |
| 2002/0170960 A1 | 11/2002 | Ehrensvard et al. | |
| 2003/0021418 A1 | 1/2003 | Arakawa et al. | |
| 2003/0072059 A1 | 4/2003 | Thomas et al. | |
| 2003/0093663 A1* | 5/2003 | Walker | 713/150 |
| 2003/0108199 A1 | 6/2003 | Pinder et al. | |
| 2003/0113118 A1 | 6/2003 | Bartur | |
| 2003/0128411 A1 | 7/2003 | Aronson et al. | |
| 2003/0154355 A1 | 8/2003 | Fernandez | |
| 2003/0159036 A1 | 8/2003 | Walmsley et al. | |
| 2003/0172268 A1 | 9/2003 | Walmsley et al. | |
| 2003/0188175 A1 | 10/2003 | Volk et al. | |
| 2004/0052377 A1 | 3/2004 | Mattox et al. | |
| 2004/0054678 A1* | 3/2004 | Okamoto et al. | 707/100 |
| 2004/0064699 A1 | 4/2004 | Hooker et al. | |
| 2004/0081079 A1 | 4/2004 | Forest et al. | |
| 2004/0177369 A1 | 9/2004 | Akins, III | |
| 2004/0249817 A1 | 12/2004 | Liu et al. | |
| 2005/0001152 A1 | 1/2005 | Stewart et al. | |
| 2005/0001589 A1 | 1/2005 | Edington | |
| 2005/0085193 A1 | 4/2005 | Stromberg et al. | |
| 2005/0113068 A1* | 5/2005 | Hoffmann | 455/411 |
| 2005/0113069 A1 | 5/2005 | Knauerhase et al. | |
| 2005/0174236 A1 | 8/2005 | Brookner | |
| 2005/0203582 A1* | 9/2005 | Healy et al. | 607/31 |
| 2005/0237991 A1 | 10/2005 | Dybsetter | |
| 2006/0112246 A1* | 5/2006 | Boning | 711/163 |
| 2006/0117181 A1 | 6/2006 | Brickell | |
| 2006/0156415 A1 | 7/2006 | Rubinstein et al. | |
| 2006/0232376 A1 | 10/2006 | Blaker | |
| 2006/0290519 A1* | 12/2006 | Boate et al. | 340/573.4 |
| 2007/0083491 A1 | 4/2007 | Walmsley et al. | |
| 2007/0083916 A1* | 4/2007 | Coyle | 726/4 |
| 2007/0092258 A1* | 4/2007 | Nelson | 398/135 |
| 2007/0130254 A1 | 6/2007 | Russ et al. | |
| 2007/0143636 A1* | 6/2007 | Bailey et al. | 713/300 |
| 2007/0177879 A1* | 8/2007 | Hsieh | 398/151 |
| 2007/0180515 A1 | 8/2007 | Danilak | |
| 2007/0192599 A1 | 8/2007 | Kato et al. | |
| 2008/0022360 A1* | 1/2008 | Bacastow | 726/1 |
| 2008/0163743 A1 | 7/2008 | Freedman | |
| 2008/0191872 A1* | 8/2008 | Cardona et al. | 340/568.1 |
| 2008/0229104 A1 | 9/2008 | Ju et al. | |
| 2008/0267408 A1* | 10/2008 | Hsieh | 380/278 |
| 2009/0138709 A1 | 5/2009 | Ekkizogloy | |
| 2009/0240945 A1* | 9/2009 | Aronson | 713/176 |
| 2010/0005301 A1 | 1/2010 | Asano et al. | |

OTHER PUBLICATIONS

Disable USB ports to prevent unauthorized data transfers; James Detwiler; Jan. 16, 2003.*

Digital Signatures; Kevin McCurley; http://www.mccurley.org/papers/health/node14.html; Mar. 11, 1995, accessed Nov. 5, 2014.*

Open Sesame: Harddrive Password Hacking with a OpenBench Logic Sniffer; http://shackspace.de/?p=1976; Apr. 27, 2011; accessed Nov. 5, 2014.*

Menezes, et al., *Handbook of Applied Cryptography*, Chapter 1, CRC Press, 1996 (48 pages).

Menezes et al., *Handbook of Applied Cryptography*, 1997, pp. 397, 398, 403-405, 548, 549, 559, 560 (9 pages).

U.S. Appl. No. 10/718,753, Sep. 23, 2010, Office Action.
U.S. Appl. No. 10/718,753, May 25, 2010, Office Action.
U.S. Appl. No. 10/718,753, Nov. 20, 2009, Office Action.
U.S. Appl. No. 10/718,753, Mar. 31, 2009, Office Action.
U.S. Appl. No. 10/718,753, Aug. 26, 2008, Office Action.
U.S. Appl. No. 10/718,753, Apr. 10, 2008, Office Action.
U.S. Appl. No. 11/739,539, Jun. 10, 2010, Office Action.
U.S. Appl. No. 11/739,539, Nov. 30, 2010, Office Action.
200410095201.0, Apr. 11, 2008, Office Action (China).
04090443.5, Mar. 20, 2006, Office Action (EPO).
EP 04 09 0443, Apr. 6, 2005, European Search Report.
U.S. Appl. No. 10/718,753, Aug. 30, 2011, Office Action.
U.S. Appl. No. 10/718,753, Mar. 17, 2011, Office Action.
U.S. Appl. No. 11/739,539, Jul. 8, 2011, Office Action.
U.S. Appl. No. 12/264,194, Sep. 28, 2010, Office Action.
U.S. Appl. No. 12/265,194, Apr. 27, 2011, Office Action.
U.S. Appl. No. 10/718,753, Dec. 21, 2011, Notice of Allowance.
U.S. Appl. No. 11/739,539, Jan. 19, 2012, Office Action.
U.S. Appl. No. 11/739,539, Oct. 3, 2013, Office Action.
U.S. Appl. No. 11/739,539, Feb. 12, 2014, Notice of Allowance.
U.S. Appl. No. 12/264,194, Feb. 2, 2012, Office Action.
U.S. Appl. No. 12/264,194, Jul. 6, 2012, Office Action.
U.S. Appl. No. 12/264,194, Dec. 17, 2012, Office Action.
Microsoft Computer Dictioinary 5th Edition, 2002, Microsoft Press, 5th Edition, 3 pgs.
Office Action in U.S. Appl. No. 12/323,731, dated May 16, 2011, 22 pgs.
Office Action in U.S. Appl. No. 12/323,731, dated Sep. 27, 2011, 23 pgs.
Office Action in U.S. Appl. No. 12/323,731, dated Feb. 2, 2012, 27 pgs.
Office Action in U.S. Appl. No. 12/323,731, dated Aug. 23, 2012, 25 pgs.
Office Action in U.S. Appl. No. 12/323,731, dated Dec. 19, 2013, 28 pgs.
Notice of Allowance in U.S. Appl. No. 12/323,731, dated Apr. 21, 2014, 18 pgs.

* cited by examiner

PROTECTING AGAINST COUNTERFEIT ELECTRONIC DEVICES

CROSS-REFERENCE TO RELATED APPLICATIONS

This application claims the benefit of and priority to U.S. Provisional Patent Application Ser. No. 60/980,069 filed on Oct. 15, 2007, which application is incorporated herein by reference in its entirety.

BACKGROUND OF THE INVENTION

One challenge that is increasingly encountered with electronic devices involves the authenticity of peripheral devices used in connection with the device. For instance, manufacturers and users of optical networking devices that employ optical transceivers—such as routers, switches, and the like—often desire that only authentic transceivers originating from a reliable manufacturer be used in their devices. Unfortunately, knock-off transceivers of unknown or spurious origin can infiltrate the transceiver market such that they are employed in optical networking devices. Such optical transceivers can be of inferior quality or be configured contrary to what is needed or desired. As a result, operation of the optical networking device itself and/or the network can be compromised. In some instances, the data being transmitted can be subject to security risks. More specifically, counterfeit devices can compromise security and operation of networks in part because the user has no assurance or understanding of the operating parameters of the counterfeit devices.

In light of the above, a need exists in the art for a means by which the identity of optical transceivers and other communications modules can be authenticated so as to prevent unknown or counterfeit devices from being employed in critical optical networking applications.

BRIEF SUMMARY OF THE INVENTION

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Embodiments of the invention relate to the authentication of devices that may be used in a network or in conjunction with a host. The ability to authenticate devices, such as optical transceivers, ensures that authentic devices are being used. This allows end users to have confidence in the operation of the devices and to know that the devices are operating as expected according to specified parameters.

One embodiment of the invention includes a method of authenticating a second device connected to a first device. In one embodiment, authentication of a device is achieved by a combination of encryption and data exchange. One of the devices, for example, may provide a data string to the other device. The receiving device then returns an altered version of the data string back to the sending device. The sending device can then compare these two strings to authenticate the receiving device. In other words, embodiments of the invention can authenticate a device by ensuring that a new device can perform a string operation as expected by an authentic device.

For example, the method may include transmitting a first data string from the first device to the second device and receiving a second data string at the first device from the second device. The second data string has been altered by the second device. The method may also include generating a third data string using an alteration key at the first device and comparing the second data string and the third data string. The method further includes authenticating the second device if the compared data strings match. In this manner, the first device can authenticate t the second device using both data alteration and data exchange.

Another embodiment of the invention includes a method of authenticating a second device connected to a first device. The method includes providing a first data string to the first device and generating a second data string using an encryption key at the first device. The method also includes transmitting the second data string from the first device to the second device and receiving a third data string at the first device from the second device. The method further includes comparing the first data string and the third data string and authenticating the second device if the first data string and the third data string match.

Another embodiment of the invention includes a first device to be connected to a second device. The first device includes a transmit module for transmitting signals to the second device and a receive module for receiving signals from the first device. The first device also includes a data string generator and an alteration key. The first device further includes an alteration module and a comparison module for authenticating the second device by comparing data strings.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

There are a number of reasons for authenticating devices in communication with other devices. If the manufacturer is reliable, an authentic device provides some assurance as to the quality of the device and as to the operating parameters of the device. Further, the configuration of the device can be known, ensuring that the device is compatible with other devices to which it is connected. A device that does not operate as expected or that does not perform according to specifications can compromise the network, cause problems that are difficult to trace, or affect the security of the network.

As a result, there are many reasons, both subjective and objective, for ensuring that devices used in products or networks are authentic.

Conventional methods for authenticating a device, such as a transceiver, suffer from a number of drawbacks. Known components or known data in a particular memory location are subject to copying. The connection between the devices may be subject to "sniffing" or monitor and capture of the data stream, revealing the data used to authenticate a device. Additionally, nonvolatile memory used to store identification data can be hacked to reveal methods of authentication. Authentication systems and methods that avoid some or all of these problems would, therefore, be highly beneficial.

Figure 1:
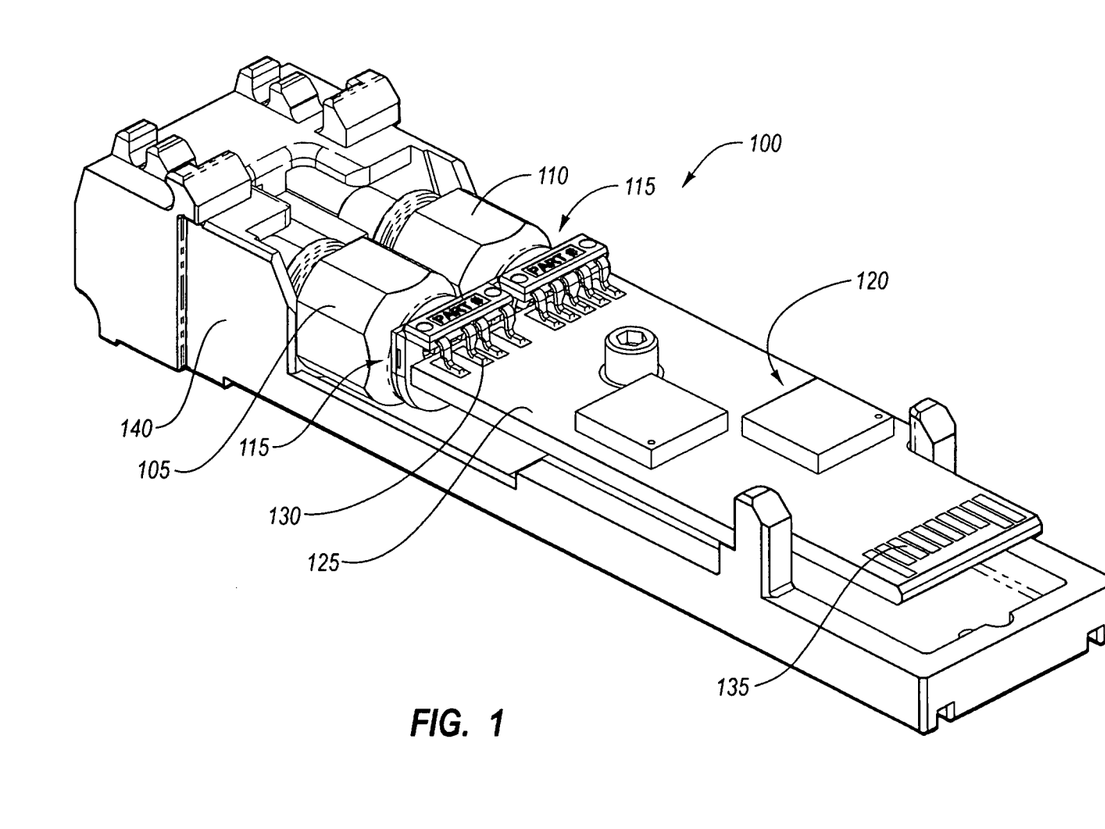
FIG. 1 illustrates an example of a transceiver in which the principles of the present invention may be employed.

FIG. 1 illustrates an example of a transceiver 100 in which the principles of the present invention may be employed. One of skill in the art can appreciate that embodiments of the invention can also be employed in other devices or in systems of devices. The devices can be the same type of devices or can be arranged in other configurations—such as a host and device or master-slave configuration.

This example of the transceiver 100 includes various components, including a receiver optical subassembly (ROSA) 105, a transmitter optical subassembly (TOSA) 110, lead frame connectors 115, an integrated circuit controller 120, and a printed circuit board (PCB) 125. Two lead frame connectors 115 are included in the transceiver 100, one each used to electrically connect the ROSA 105 and the TOSA 110 to a plurality of conductive pads 130 located on the PCB 125. The controller 120 is also operably attached to the PCB 125. An edge connector 135 is located on an end of the PCB 125 to enable the transceiver 100 to electrically interface with a host (not shown). As such, the PCB 125 facilitates electrical communication between the ROSA 105/TOSA 110, and the host. In addition, the above-mentioned components of the transceiver 100 are partially housed within a housing portion 140. A shell can cooperate with the housing portion 140 to define a covering for the components of the transceiver 100.

The PCB 125 includes circuitry and electronic components for use with the TOSA 110 and ROSA 105 in performing the optical signal transmission and reception activities of the transceiver 100. Among the components of the PCB 125 are a laser driver, a post amplifier, and a controller 120. It will be appreciated that one or more of these components can be integrated on a single chip, or can be separately disposed on the PCB 125. In some embodiments, a transceiver 100 can use the controller 120 to authenticate itself to the host system as discussed below.

Embodiments of the invention allow device authentication to occur in various configurations. A host, for example, may authenticate a transceiver via the electrical interface. The transceiver can authenticate another remote device over an optical connection.

Figure 2:
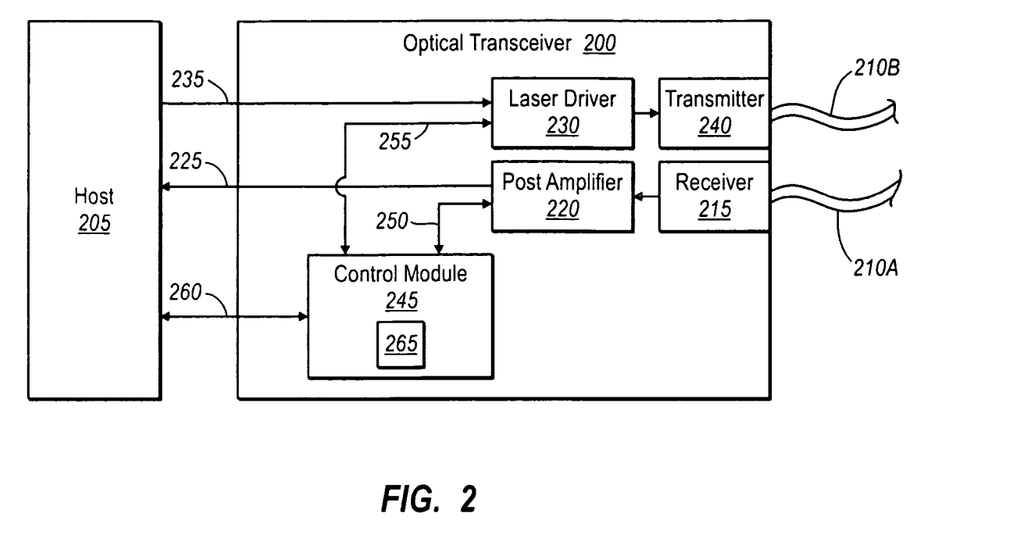
FIG. 2 illustrates an example of a transceiver connected to a host device.

FIG. 2 illustrates an example of a transceiver 200 connected to a host device 205, which can be any computing system capable of communication with the optical transceiver. The transceiver 200 receives an optical signal from fiber 210A using receiver 215. The receiver 215 acts as an opto-electric transducer by transforming the optical signal into an electrical signal. The receiver 215 provides the resulting electrical signal to a post-amplifier 220. The post-amplifier 220 amplifies the electrical signal and provides the amplified signal to the external host 205 as represented by arrow 225. The external host 205 may be, in one example, a transceiver host box capable of housing and communicating with multiple transceivers.

The transceiver 200 may also receive electrical signals from the host 205 for transmission onto the fiber 210B. Specifically, the laser driver 230 receives an electrical signal from host 205 as represented by the arrow 235, and drives the transmitter 240 (e.g., a laser or Light Emitting Diode (LED)) to emit optical signals onto the fiber 210B, where optical signals are representative of the information in the electrical signal provided by the host 205. Accordingly, the transmitter 240 serves as an electro-optic transducer. Thus, the receiver 215 and transmitter 240 provide an optical connection to the optical fibers 210A and 210B. In some embodiments, the fibers 210A and 210B may be combined in a single coaxial optical fiber cable.

The transceiver 200 includes a control module 245, which may evaluate operating conditions, such as, but not limited to, temperature, voltage, and low frequency changes (such as receive power) from the post-amplifier 220 (as represented by arrow 250) and/or from the laser driver 230 (as represented by arrow 255). This allows the control module 245 to optimize the dynamically varying performance, and additionally detect when there is a loss of signal. The control module 245 can also control the operation of post amplifier 220, and/or laser driver 230, and, hence, can control the operation of transceiver 200.

Data may be exchanged between the control module 245 and host 205 using an appropriate interface or bus 260. In some embodiments, I²C is implemented as the data interface protocol between the host 205 and the control module 245 and data and clock signals may be provided from the host 205 using a serial clock line and a serial data line, both of which are represented by the bus 260. However, MDIO, 1-wire, or any other data interface protocol between the host 205 and the control module 245 can be implemented in the system.

The control module 245 may include one or more general purpose processors 265 or other computing devices such as a programmable logic device ("PLD"), application specific integrated circuit ("ASIC"), or field programmable gate array ("FPGA"). The one or more processors 265 recognize instructions that follow a particular instruction set, and may perform normal general-purpose operations such as shifting, branching, adding, subtracting, multiplying, dividing, Boolean operations, comparison operations, and the like. In one embodiment, the one or more processors 265 are a 16-bit processor. The control module may additionally include an internal control module memory, which may be Random Access Memory (RAM) or nonvolatile memory. While the internal control module memory may be RAM, it may also be a processor, register, flip-flop or other memory device.

The control module 245 may have access to a persistent memory external to the control module 245, which in one embodiment is an electrically erasable programmable read-only memory (EEPROM). Persistent memory may also be any other nonvolatile memory source. The persistent memory and the control module 245 may be packaged together in the same package or in different packages without restriction.

Figure 3:
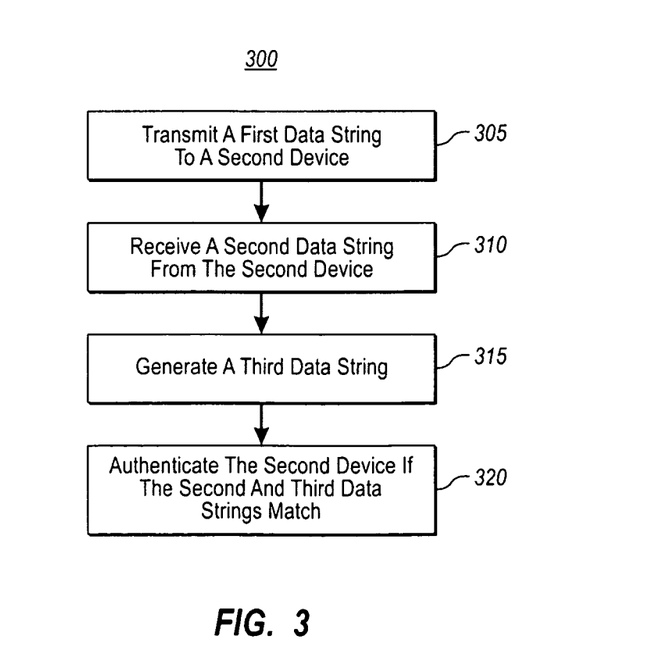
FIG. 3 is a flow diagram illustrating a method for authenticating a second device connected to a first device.

FIG. 3 illustrates an example of a method 300 for authenticating a second device connected to a first device. Authenticating the second device can ensure the quality of the device, can ensure proper function of the device, can ensure that the device is compatible with the first device, or can be used for other purposes. The present invention can be implemented in various devices. By way of example, and not restriction, the present invention will be described in terms of a transceiver, as a first device, connected to a host, as a second device. However, note that either the first or second device could be any device configured to connect to other devices. Examples of such devices include transceivers, transponders, hosts, computers, televisions, servers or any other device which is connected to other devices.

The method 300 includes transmitting 305 a first data string from the first device to the second device. The first data string will be used in authentication of the second device as described below. The first data string can include random or pseudorandom data strings. A random process, by way of example only, may be a repeating process whose outcomes follow no describable deterministic pattern, but follow a probability distribution. A pseudorandom process is a process that appears random but is not, strictly speaking, random. Pseudorandom sequences typically exhibit statistical randomness while being generated by an entirely deterministic causal process.

In some embodiments, the first data string can be used by both the first and second devices. The first data string can be created in duplicate, can be copied, or a second copy may be produced in some other way. In other embodiments, the first data string can be used by only one device. Whether the first data string is used by the first device, the second device, or both depends on the authentication method chosen, to be discussed below. The first data string can be generated at the first device. Alternatively, the data string can be transmitted to the first device from some external device, or one or more data strings can be stored at the first device for use as the first data string or can be provided in any other manner.

Transmitting 305 the first data string from the first device to the second device can be accomplished using any appropriate interface or bus. In some embodiments, $I^2C$ is implemented as the data interface protocol between the first device and the second device. Data and clock signals may be provided from the first device to the second device using a serial clock line and a serial data line. However, MDIO, 1-wire, or any other data interface protocol between the first device and the second device can be implemented in the system.

The method 300 also includes receiving 310 a second data string. In some embodiments, the second data string can be received using the same interface, bus or other device used to transmit the first data string. In other embodiments, the second data string can be received using a different interface, bus or other device.

In some embodiments, the second data string is an altered copy of the first data string generated using an alteration key at the second device. An alteration key may be a set of instructions for altering a data string in a particular manner. In some embodiments, the alteration key can be an encryption key. In cryptography, an encryption key is a piece of information (a parameter) that determines the functional output of a cryptographic algorithm. That is, an encryption key is the mapping function, which is implemented by an encryption algorithm. In encryption, a key specifies the particular transformation of plaintext into ciphertext, or vice versa, during decryption. For example, a simple encryption key could be a mapping of one character to the subsequent character (i.e. "a"→"b", "b"→"c", etc.).

Note that altering can be used to unalter a data string, just as decryption is a type of encryption. That is, by properly altering a data string that has previously been properly altered, an unaltered message can be produced. For example, a data string encrypted using the example key above can be decrypted by using an encryption key which maps one character to the previous character (i.e. "b"→"a", "c"→"b", etc.). Encryption algorithms which use the same key for both encryption and decryption are known as symmetric key algorithms. Examples of symmetric key algorithms are block ciphers, stream ciphers, AES, Twofish, and Rabbit. Encryption algorithms which use different keys for encryption and decryption are known as asymmetric key algorithms. Examples of asymmetric key algorithms are Diffie-Hellman, Digital Signature Standard (DSS), ElGamal, Elliptic Curve, Paillier, RSA and Cramer-Shoup.

The method 300 further includes generating 315 a third data string at the first device. In some embodiments, the third data string is an altered copy of the first data string generated using an alteration key. The alteration keys at the first device and the second device can be identical. In other embodiments, the third data string is an altered copy of the second data string generated using an alteration key.

The method 300 also includes authenticating 320 the second device if the second data string and third data string match. For example, if the first device and the second device have identical alteration keys, the second data string and the third data string, which were both generated from the first data string using the identical alteration keys, will be identical. That is, both the first device and the second device used identical alteration keys to alter identical data strings and the resultant data strings were identical. Note that this does not necessarily require the algorithm to be a symmetric algorithm, since the altered data strings may be compared, rather than unaltered.

In other embodiments, authenticating the second device will require the first data string and third data string to match. For example, if the second device uses an alteration key to produce the second data string from the first data string. The second data string received at the first device is an altered copy of the first data string. The first device could then use an alteration key to unalter the second data string to produce the third data string. If the first data string matches the third data string, the match can indicate that the second device properly altered the first data string. That is, if the unaltered message matches the original, the match may be an indication that the second device contains the correct alteration key.

The appropriate strings can be compared using any device configured to compare data strings. In some embodiments, a comparator can be used to check if the appropriate data strings match. A comparator is a hardware electronic device that compares two numbers in binary form and generates a one or a zero at its output depending on whether or not they are the same. Comparators can be located in a central processing unit (CPU) or microcontroller in branching software.

In other embodiments, a subtractor can be used to compare the appropriate data strings. That is, the data strings can be said to match because if $A=B$ then $A-B=0$. Alternatively an adder can be used because $A+(-B)=A-B$. In further embodiments, an AND gate, or any other device configured to perform a similar function such as an inverted NOR gate, can be used to check if the appropriate data strings match.

If the second device is not authenticated the first device can take corrective action. In some embodiments, corrective action can include generating and sending an alert to a system administrator, who can then take appropriate actions. In other embodiments, corrective action can include withholding power from the second device, thus preventing it from functioning. In further embodiments, corrective action can include refusing data from the second device.

Figure 4:
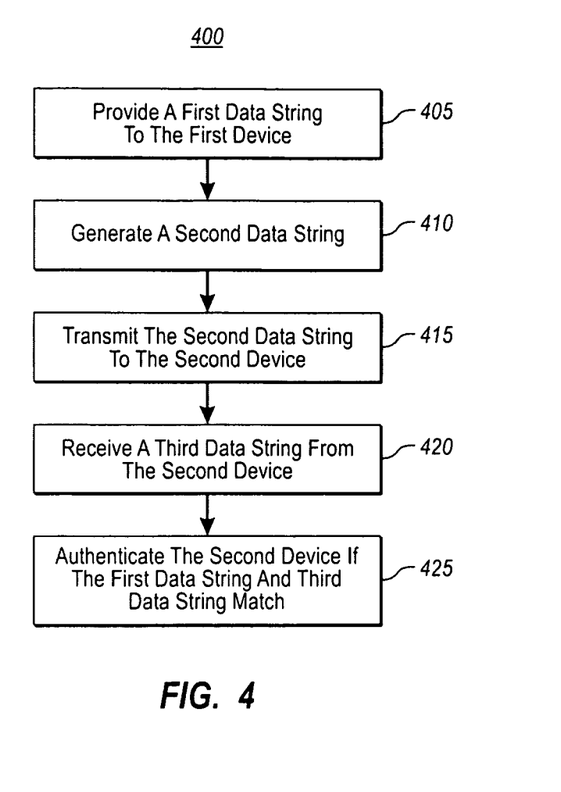
FIG. 4 is a flow diagram illustrating another method for authenticating a second device connected to a first device.

FIG. 4 illustrates another example of a method 400 for authenticating a second device connected to a first device. Authenticating the second device can ensure the quality of the device, can ensure proper function of the device, can ensure that the device is compatible with the first device, or can be used for other purposes. The present invention can be implemented in various devices. By way of example, and not restriction, the present invention will be described in terms of a transceiver, as a first device, connected to a host, as a second device. However, note that either the first or second device could be any device configured to connect to other devices.

Examples of such devices include transceivers, transponders, hosts, computers, televisions, servers or any other device which is connected to other devices.

The method 400 includes providing 405 a first data string to the first device. The first data string will be used in authentication of the second device as described below. The first data string can include random or pseudorandom data strings. In some embodiments, the first data string can be generated at the first device. In other embodiments, the data string can be transmitted to the first device from some external device. In further embodiments, one or more data strings can be stored at the first device for use as the first data string, or can be provided in any other manner.

The method 400 also includes generating 410 a second data string at the first device. In some embodiments, the second data string is an altered copy of the first data string generated using an alteration key. An alteration key is a set of instructions for altering a data string in a particular manner. In some embodiments, the alteration key can be an encryption key. In cryptography, an encryption key is a piece of information (a parameter) that determines the functional output of a cryptographic algorithm. That is, an encryption key is the mapping function, which is implemented by an encryption algorithm. In encryption, a key specifies the particular transformation of plaintext into ciphertext, or vice versa, during decryption.

The method 400 further includes transmitting 415 the second data string to the second device. Transmission of the second data string from the first device to the second device can be accomplished using any appropriate interface or bus. In some embodiments, I²C is implemented as the data interface protocol between the first device and the second device. Data and clock signals may be provided from the first device to the second device using a serial clock line and a serial data line. However, MDIO, 1-wire, or any other data interface protocol between the first device and the second device can be implemented in the system.

The method 400 also includes receiving 420 a third data string. In some embodiments, the third data string is an altered copy of the second data string generated using an alteration key at the second device. In some embodiments, the third data string can be received using the same interface, bus or other device used to transmit the second data string. In other embodiments, the third data string can be received using a different interface, bus, or other device.

The method 400 further includes authenticating 425 the second device if the first data string and third data string match. For example, if the second device uses an alteration key to produce the third data string from the second data string. The third data string received at the first device is then an unaltered copy of the second data string. If the first data string matches the third data string, the match can indicate that the second device properly altered the second data string. That is, if the unaltered message matches the original, the match may be an indication that the second device contains the correct alteration key.

The first data string and third data string can be compared using any device configured to compare data strings. In some embodiments, a comparator can be used to check if the appropriate data strings match. A comparator is a hardware electronic device that compares two numbers in binary form and generates a one or a zero at its output depending on whether or not they are the same. Comparators can be located in a central processing unit (CPU) or microcontroller in branching software.

In other embodiments, a subtractor can be used to compare the first data string and the third data string. That is, the data strings can be said to match because if A=B then A−B=0. Alternatively an adder can be used because A+(−B)=A−B. In further embodiments, an AND gate, or any other device configured to perform a similar function such as an inverted NOR gate, can be used to check if the appropriate data strings match.

If the second device is not authenticated the first device can take corrective action. In some embodiments, corrective action can include generating and sending an alert to a system administrator, who can then take appropriate actions. In other embodiments, corrective action can include withholding power from the second device, thus preventing it from functioning. In further embodiments, corrective action can include refusing data from the second device.

Figure 5:
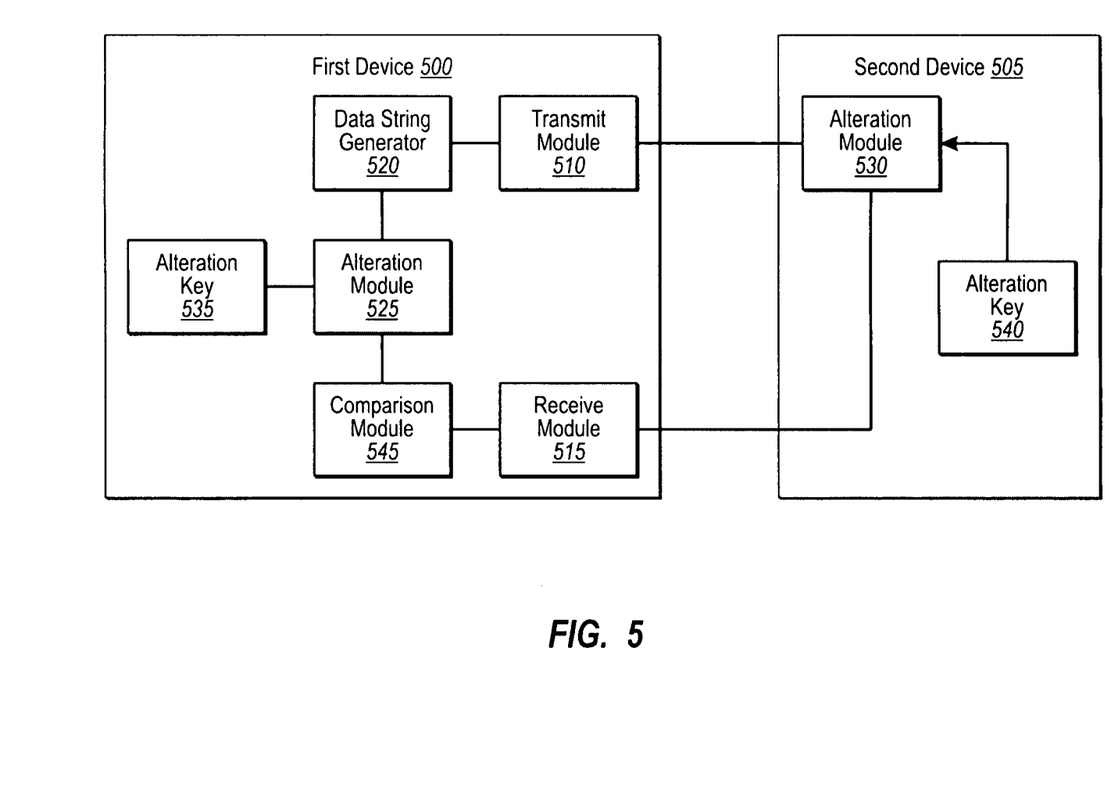
FIG. 5 illustrates a block diagram of a device that authenticates a second device using a combination of data alteration and data exchange.

FIG. 5 illustrates a block diagram of an example embodiment. A first device 500 is shown connected to a second device 505. The present invention can be implemented in various devices. By way of example, and not restriction, the present invention will be described in terms of a transceiver, as a first device 500, connected to a host, as a second device 505. However, note that either the first device 500 or the second device 505 could be any device configured to connect to other devices. Examples of such devices include transceivers, transponders, hosts, computers, televisions, servers or any other device which is connected to other devices.

Although the first device 500 and the second device 505, as shown, have several different modules, the modules may be combined, without restriction. That is, any or all a modules can be combined, in any fashion, as long as the appropriate functions are provided. As shown in FIG. 5, the first device 500 includes a transmit module 510 to transmit data to the second device 505. The first device 500 also includes a receive module 515 to receive data from the second device 505.

Also shown as a component in the first device 500 is a data string generator 520. The data string generator 520 is configured to provide a data string that can be random or pseudorandom. In some embodiments, the data string generator 520 can produce the data string. In other embodiments, the data string generator 520 can receive the data string from an external device. In further embodiments, the data string generator 520 can store pre-generated data strings.

Additional components shown in the first device 500 and second device 505 of FIG. 5 are alteration modules 525 and 530. The alteration modules 525 and 530 use the alteration keys 535 and 540 to alter a data string. The alteration modules 525 and 530 are sets of instructions for altering a data string in a particular manner. In some embodiments, the alteration keys 535 and 540 can be encryption keys. In cryptography, an encryption key is a piece of information (a parameter) that determines the functional output of a cryptographic algorithm. That is, an encryption key is the mapping function, which is implemented by the encryptor module to encrypt the data. Note that altering can be used to unalter a data string, just as decryption is a type of encryption. That is, by properly altering a data string that has previously been properly altered, an unaltered message can be produced. Therefore, the alteration modules 525 and 530 can use the alteration keys to unalter the data string.

In some embodiments, the alteration key 535 provided to the first device 500 and the alteration key 540 provided to the second device 505 can be identical to one another. In other embodiments, the alteration keys 535 and 540 can be complimentary. That is, one alteration key can be used to alter a data string and the other alteration key can be used to unalter the altered data string.

In order to prevent unauthorized users from obtaining the alteration keys 535 and 540, the alteration key can be provided to the first device 500 or second device 505 at manufacture. Providing the alteration key to the first device 500 may include programming the alteration key 535 into a processor, PLD, ASIC, FPGA, or other computing module of the first device 500. The processor, PLD, ASIC, FPGA, or other computing module can then be read-protected, thereby preventing the alteration key 535 from being read out by an unauthorized user. The alteration key 540 can similarly be programmed into and read-protected in a processor, PLD, ASIC, FPGA, or other computing module of the second device 505 to prevent an unauthorized user from obtaining the alteration key 540.

Another component of the first device 500 is a comparison module 545. The comparison module 545 is used for comparing the appropriate data strings. The comparison module 545 is any device configured to compare data strings. In some embodiments, a comparator can be used to check if the appropriate data strings match. A comparator is a hardware electronic device that compares two numbers in binary form and generates a one or a zero at its output depending on whether or not they are the same. Comparators can be located in a central processing unit (CPU) or microcontroller in branching software.

In other embodiments, a subtractor can be used. That is, the data strings can be said to match because if A=B then A−B=0. Alternatively an adder can be used because A+(−B)=A−B. In further embodiments, an AND gate, or any other device configured to perform a similar function, such as an inverted NOR gate, can be used to check if the appropriate data strings match.

In some embodiments a data string which has been transmitted to the second device 505, altered by the second device 505 and returned to the first device 500 is compared to a data string which has been altered by the first device 500. In other embodiments, the original data string is compared to a data string which has been transmitted to the second device 505, altered by the second device 505, returned to the first device 500 and unaltered by the first device 500. In further embodiments, the original data string is compared to a data string which has been altered by the first device 500, transmitted to the second device 505, unaltered by the second device 505 and returned to the first device 500.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of authenticating a second device connected to a first device, the method comprising:
   transmitting a first data string from the first device to the second device, the first device including a first encryption key provided to the first device at manufacture of the first device and the second device including a second encryption key provided to the second device at manufacture of the second device, wherein one of the first device and the second device is a first host device and the other one of the first device and the second device is a first optical transceiver having a first edge connector through which the first optical transceiver transmits data to the first host device and through which the first optical transceiver receives data from the first host device;
   generating, at the second device, a second data string by applying the second encryption key to the first data string such that the second data string is a first encrypted copy of the first data string;
   transmitting the second data string from the second device to the first device;
   receiving the second data string at the first device from the second device;
   generating, at the first device, a third data string by applying the first encryption key to the first data string such that the third data string is a second encrypted copy of the first data string;
   comparing, at the first device, the third data string and the second data string;
   authenticating the second device as an authentic device from a reliable manufacturer when the third data string and the second data string match; and
   withholding power from the first optical transceiver by the first host device not transmitting power to the first optical transceiver through the first edge connector to prevent the first optical transceiver from functioning while maintaining power to the first host device when the second device is not authenticated.

2. The method according to claim 1, wherein the first data string includes a random data string or a pseudo-random data string.

3. The method according to claim 1, further comprising generating the first data string at the first device.

4. The method according to claim 1, wherein the second encryption key is programmed into the second device.

5. The method according to claim 1, wherein authenticating the second device as an authentic device ensures the second device is compatible with the first device.

6. A method of authenticating an optical transceiver locally connected to a host device, the method comprising:
   receiving a first data string at the host device, the host device including an encryption key provided to the host device at manufacture of the host device; generating, at the host device, a second data string by applying the encryption key to the first data string key such that the second data string is a first encrypted copy of the first data string, wherein the optical transceiver includes an edge connector through which the optical transceiver transmits data to the host device and through which the optical transceiver receives data from the host device;
   transmitting the second data string from the host device to the optical transceiver, the optical transceiver including a decryption key provided to the optical transceiver at manufacture of the optical transceiver;
   receiving the second data string at the optical transceiver from the host device; generating, at the optical transceiver, a third data string by applying the decryption key to the second data string such that the third data string is a decrypted copy of the second data string;
   transmitting the third data string from the optical transceiver to the host device;
   receiving the third data string at the host device from the optical transceiver;
   comparing, at the host device, the first data string and the third data string; and
   authenticating the optical transceiver as an authentic device from a reliable manufacturer when the first data string and the third data string match; and
   withholding power from the first optical transceiver by the first host device not transmitting power to the first optical transceiver through the first edge connector to prevent the first optical transceiver from functioning while maintaining power to the first host device when the second device is not authenticated.

7. The method according to claim 6, wherein the first data string includes a random data string or a pseudo-random data string.

8. The method according to claim 6, wherein the decryption key is programmed into a processor, PLD, ASIC, or FPGA.

9. The method according to claim 8, wherein the processor, PLD, ASIC, or FPGA is read protected.

10. The method according to claim 6, wherein authenticating the optical transceiver as an authentic device ensures the optical transceiver is compatible with the host device.

* * * * *